(12) United States Patent
Harada

(10) Patent No.: US 11,161,237 B2
(45) Date of Patent: Nov. 2, 2021

(54) ROBOT SEALING STRUCTURE AND ROBOT

(71) Applicant: FANUC CORPORATION, Yamanashi (JP)

(72) Inventor: Shizuo Harada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 85 days.

(21) Appl. No.: 16/703,148

(22) Filed: Dec. 4, 2019

(65) Prior Publication Data

US 2020/0206901 A1 Jul. 2, 2020

(30) Foreign Application Priority Data

Dec. 26, 2018 (JP) .............................. JP2018-241955

(51) Int. Cl.
*B25J 9/00* (2006.01)
*F16J 15/32* (2016.01)
*B25J 17/00* (2006.01)

(52) U.S. Cl.
CPC ............. *B25J 9/0009* (2013.01); *B25J 17/00* (2013.01); *F16J 15/32* (2013.01)

(58) Field of Classification Search
CPC ...... B25J 9/0009; B25J 17/00; B25J 19/0062; F16J 15/32; F16J 15/16; F16J 15/187;

(Continued)

(56) References Cited

U.S. PATENT DOCUMENTS 3,746,348 A * 7/1973 Stone ..................... F16J 15/061
285/95
2003/0080518 A1* 5/2003 Burton .................... F16L 23/22
277/616

(Continued)

FOREIGN PATENT DOCUMENTS

CN  201982659 U  *  9/2011
EP  2 351 948 A1  8/2011

(Continued)

OTHER PUBLICATIONS

Japanese Office Action dated Mar. 30, 2021, in connection with corresponding JP Application No. 2018-241955 (7 pp., including machine-generated English translation).

(Continued)

*Primary Examiner* — Jake Cook
*Assistant Examiner* — T. Scott Fix
(74) *Attorney, Agent, or Firm* — Maier & Maier, PLLC

(57) ABSTRACT

A robot sealing structure including a shaft end face of a reducer, an attachment surface of an arm member that is to be in surface contact with the shaft end face, a number of bolts that fix the shaft and the arm member to each other in a state in which the shaft end face and the attachment surface are in surface contact; a recessed flat portion that is provided in part of one of the shaft end face and the attachment surface, and a seal member that is disposed on the recessed flat portion, where the recessed flat portion is a portion recessed in a direction along the center axis line of the shaft, with respect to the shaft end face or the attachment surface, and the recessed flat portion is continuous over an entire circumference around the center axis line.

9 Claims, 9 Drawing Sheets

(58) Field of Classification Search
CPC .... F16J 15/3204; F16J 15/322; F16J 15/3216; F16J 15/3248; F16J 15/3268; F16J 15/328; F16J 15/3284; F16J 15/3472; F16J 15/50; F16J 15/54; F16J 15/02; F16J 15/021; F16J 15/022; F16J 15/061; F16J 15/0881; B23P 19/042; F16L 23/22; F16L 17/06; F16H 1/32

See application file for complete search history.

(56) References Cited

U.S. PATENT DOCUMENTS

| | | |
|---|---|---|
| 2004/0209087 A1 | 10/2004 | Ash et al. |
| 2005/0155696 A1 | 7/2005 | Ash et al. |
| 2007/0096402 A1* | 5/2007 | Lingenfelder .......... F16L 23/18 277/608 |
| 2011/0154937 A1* | 6/2011 | Liu .......................... B25J 19/00 74/490.05 |
| 2011/0243739 A1 | 10/2011 | Asano et al. |
| 2013/0264225 A1 | 10/2013 | Miyagawa |
| 2014/0084018 A1* | 3/2014 | Onillon ................... F16J 15/064 221/1 |
| 2014/0138919 A1* | 5/2014 | Barrall .................... F16J 15/02 277/590 |
| 2020/0096107 A1* | 3/2020 | Akao ...................... F16J 15/061 |
| 2020/0318762 A1* | 10/2020 | Dong ...................... F16L 23/18 |

FOREIGN PATENT DOCUMENTS

| | | |
|---|---|---|
| EP | 2 657 579 A1 | 10/2013 |
| JP | S59-85353 U | 6/1984 |
| JP | S61-249291 A | 11/1986 |
| JP | H04-094176 U | 8/1992 |
| JP | H07-017490 U | 3/1995 |
| JP | H10-141502 A | 5/1998 |
| JP | 2000-170918 A | 6/2000 |
| JP | 2001-018186 A | 1/2001 |
| JP | 2001-254787 A | 9/2001 |
| JP | 2002-239970 A | 8/2002 |
| JP | 2004-019887 A | 1/2004 |
| JP | 2006-525153 A | 11/2006 |
| JP | 2015-102221 A | 6/2015 |
| JP | 2015-139853 A | 8/2015 |
| WO | 2004/094173 A2 | 11/2004 |
| WO | 2010/061571 A1 | 6/2010 |
| WO | 2012/086115 A1 | 6/2012 |

OTHER PUBLICATIONS

Japanese Search Report dated Mar. 16, 2021, in connection with corresponding JP Application No. 2018-241955 (23 pp., including machine-generated English translation).

* cited by examiner

ROBOT SEALING STRUCTURE AND ROBOT

CROSS-REFERENCE TO RELATED APPLICATIONS

This application is based on and claims priority to Japanese Patent Application No. 2018-241955 filed on Dec. 26, 2018, the content of which is incorporated herein by reference in its entirety.

FIELD

The present invention relates to a robot sealing structure and a robot.

BACKGROUND

In the related art, there is a known technique in which a packing is made to intervene around a cover of an arm member of a robot to form a seal between the arm member and the cover (for example, see Japanese Unexamined Patent Application, Publication No. 2002-239970).

Furthermore, there is a known technique in which an O-ring ring is used to form a seal between an outer circumferential surface of a reducer and an inner circumferential surface of a hole provided in an arm member (for example, see Japanese Unexamined Patent Application, Publication No. 2001-254787).

SUMMARY

A first aspect of this disclosure provides a robot sealing structure that forms a seal between a shaft of a reducer for driving and an arm member, the robot sealing structure including: a shaft end face of the reducer; an attachment surface of the arm member, the attachment surface coming into surface contact with the shaft end face; a plurality of bolts that fix the shaft and the arm member to each other in a state in which the shaft end face and the attachment surface are in surface contact; a recessed flat portion that is provided in part of one of the shaft end face and the attachment surface; and a seal member that is disposed on the recessed flat portion, wherein the recessed flat portion is a portion recessed in a direction along a center axis line of the shaft, with respect to the shaft end face or the attachment surface, and the recessed flat portion is continuous over an entire circumference around the center axis line.

DETAILED DESCRIPTION

A robot 1 according to an embodiment will be described below with reference to the drawings.

Figure 1:
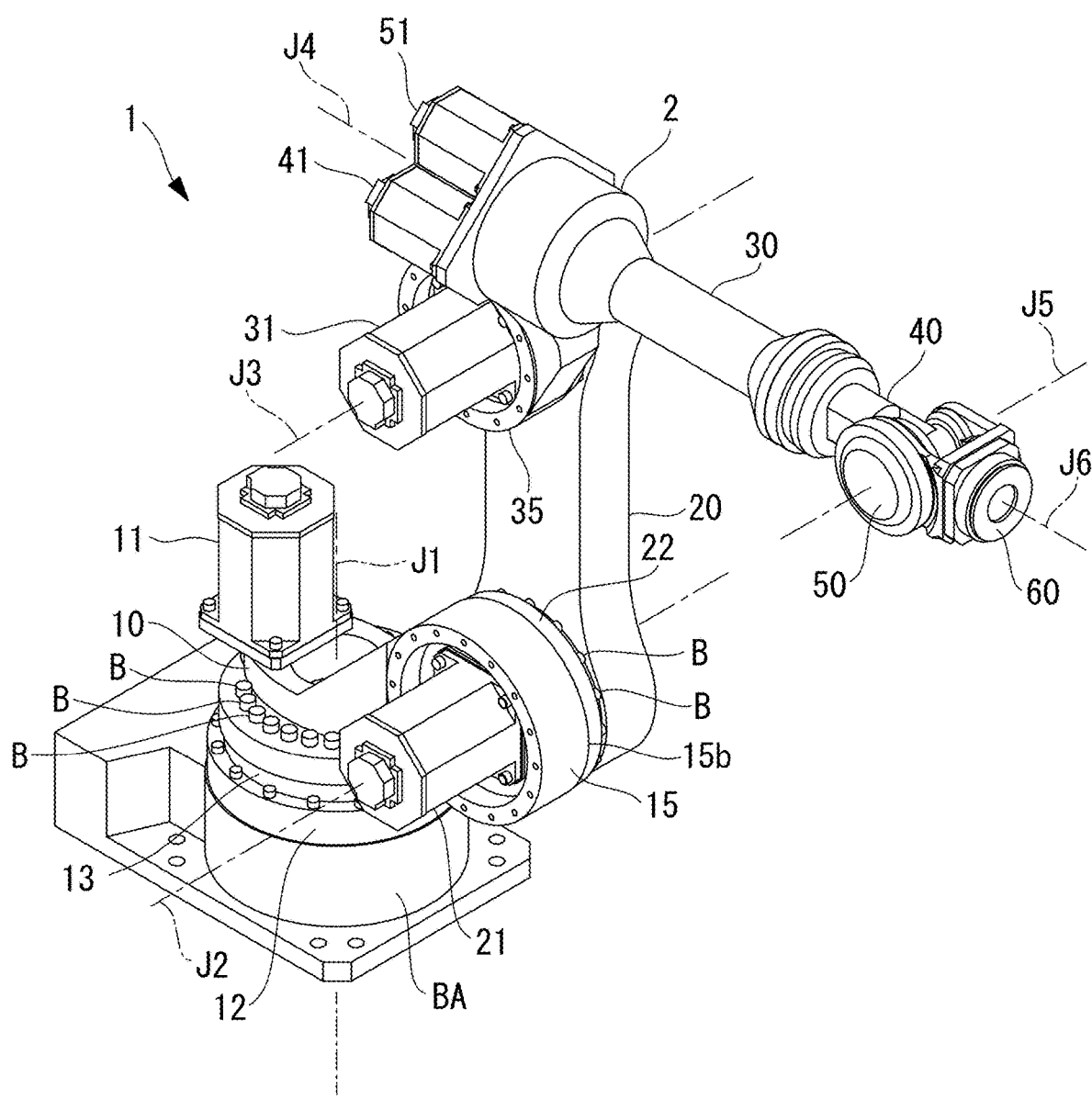
FIG. 1 is a perspective view of a robot according to an embodiment.

As shown in FIG. 1, the robot 1 of this embodiment has an arm 2, and an arbitrary tool is attached to a distal end portion of the arm 2.

Figure 2:
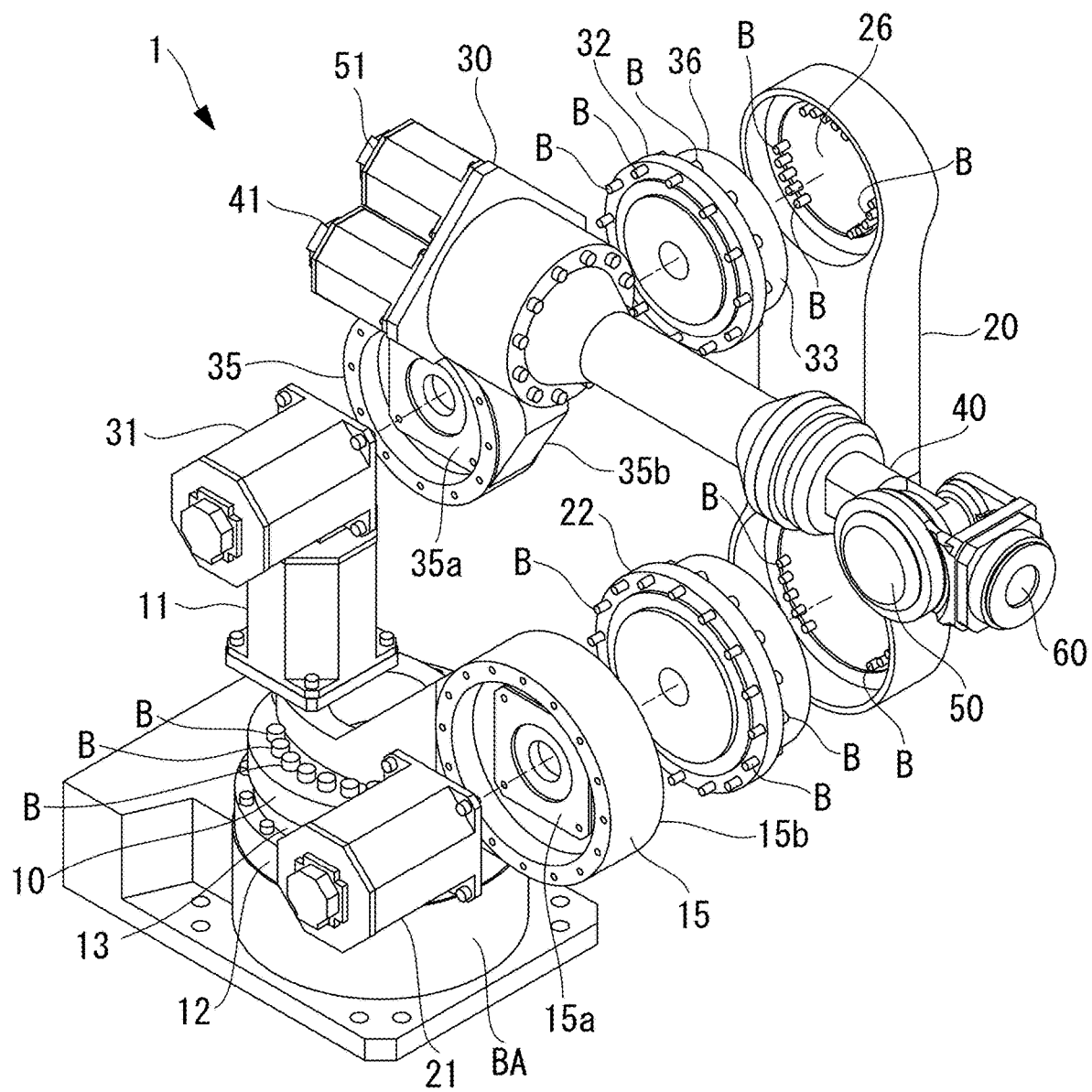
FIG. 2 is an exploded perspective view of the robot of this embodiment.

As shown in FIGS. 1, 2, etc., the arm 2 includes: a first arm member 10 that is supported on a base member BA fixed to a predetermined installation surface, so as to be rotatable about a first axis line J1 extending in the vertical direction; a second arm member 20 whose proximal end is supported by the first arm member 10 so as to be swingable about a second axis line J2 extending in a horizontal direction; and a third arm member 30 whose proximal end is supported by a distal end of the second arm member 20 so as to be swingable about a third axis line J3 extending in a horizontal direction.

Furthermore, the arm 2 includes: a fourth arm member 40 that is supported by the third arm member 30 so as to be rotatable about a fourth axis line J4 extending in the longitudinal direction of the third arm member 30; a fifth arm member 50 that is supported by the fourth arm member 40 so as to be swingable about a fifth axis line J5 extending in a direction perpendicular to the fourth axis line J4; and a sixth arm member 60 that is supported on the fifth arm member 50 so as to be rotatable about a sixth axis line J6.

Furthermore, the arm 2 includes a plurality of servomotors 11, 21, 31, 41, and 51 that respectively drive the first to fifth arm members 10 to 50 and also has a servomotor (not shown) that drives the sixth arm member 60. Various types of servomotors, such as rotation motors and linear motors, can be used as the individual servomotors.

Then, the structure of the arm 2 will be described below.

As shown in FIGS. 1 and 2, the first arm member 10 is attached to a shaft 13 of a reducer 12 for driving the first arm member 10, by using a plurality of bolts B.

A motor attachment surface 15a on which the servomotor 21 can be attached and a reducer attachment surface 15b that faces in the opposite direction from the motor attachment surface 15a and on which a reducer 22 for driving the second arm member 20 can be attached are provided at an upper end of the first arm member 10.

As shown in FIG. 2, a distal end of the second arm member 20 is attached to the third arm member 30 via a reducer 32 for driving the third arm member 30 by using a plurality of bolts B. A motor attachment surface 35a on which the servomotor 31 can be attached and a reducer attachment surface 35b that faces in the opposite direction from the motor attachment surface 35a and on which a reducer 32 for driving the third arm member 30 can be attached are provided at a proximal end of the third arm member 30.

The reducer 32 is attached on the reducer attachment surface 35b by using a plurality of bolts B, and an output shaft 33 of the reducer 32 is attached to the distal end of the second arm member 20. For example, as shown in FIGS. 2 and 3, the shaft 33 of the reducer 32 is attached to the distal end of the second arm member 20 by using a plurality of bolts B.

Figure 3:
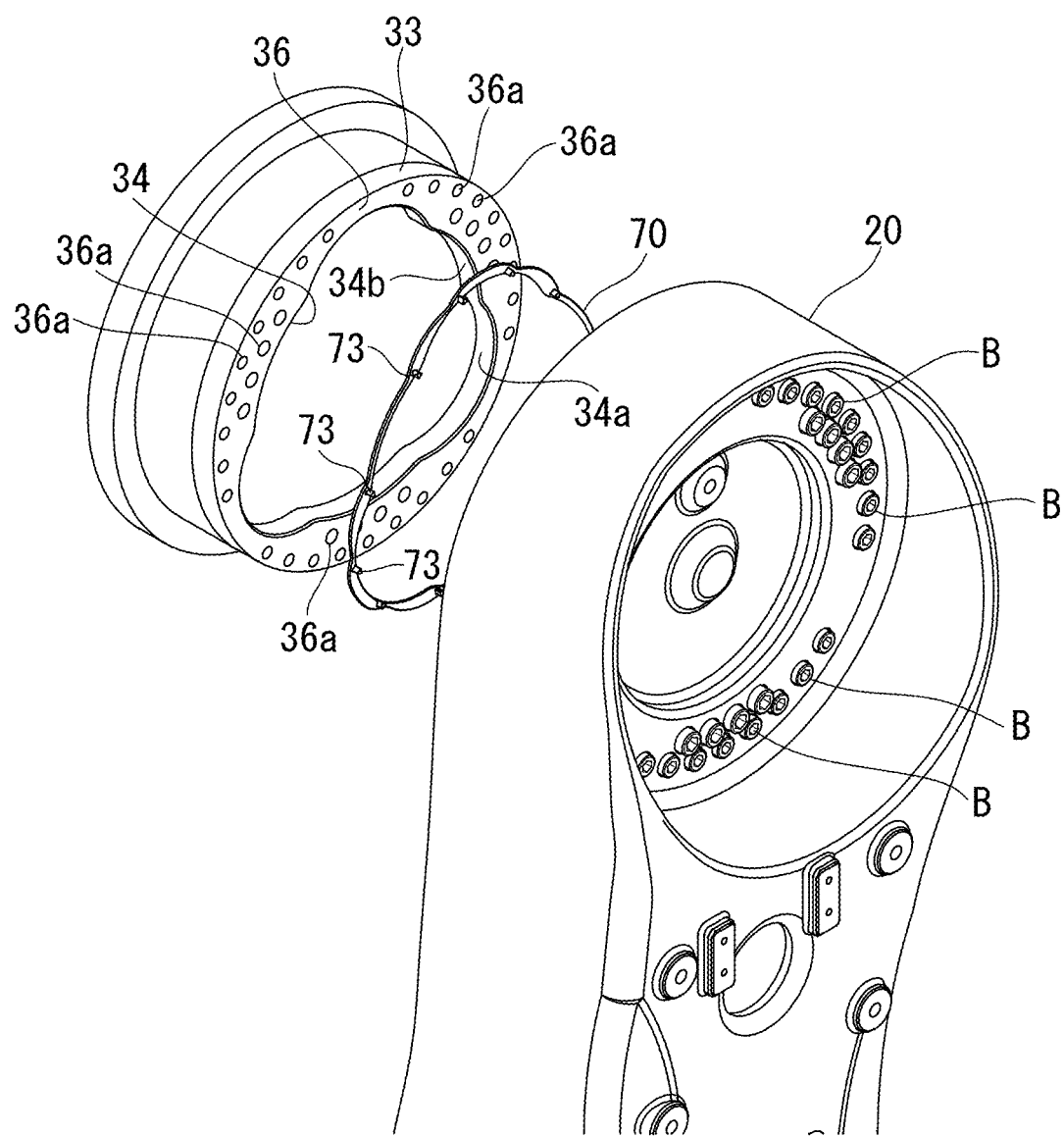
FIG. 3 is a perspective view of a second arm member and a reducer of the robot of this embodiment.
Figure 4:
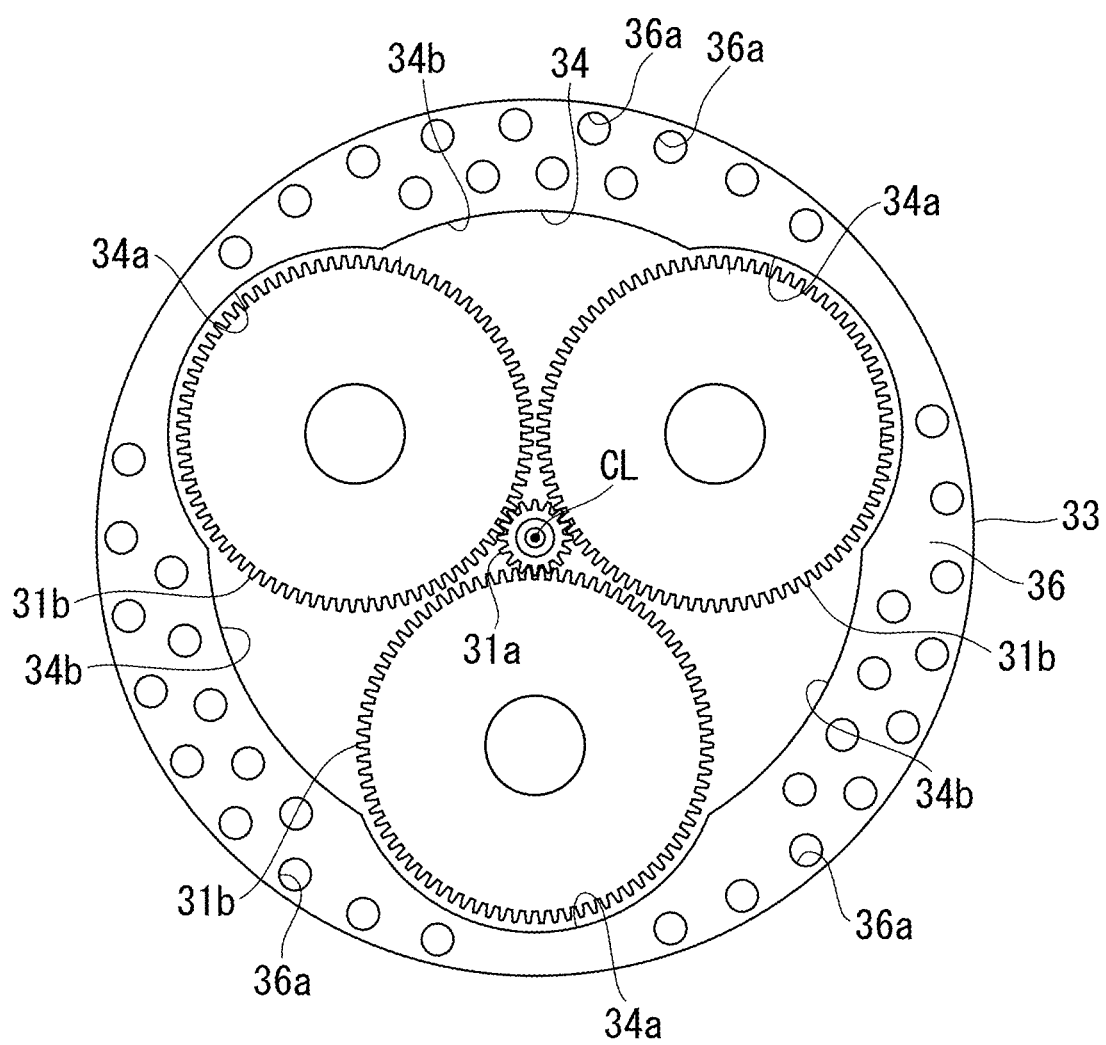
FIG. 4 is a front view of the reducer of this embodiment.

As shown in FIGS. 3 and 4, a hollow hole 34 is provided in the shaft 33 of the reducer 32, and the hollow hole 34 extends in the direction along the center axis line CL of the shaft 33 and includes the center axis line CL. An input gear 31a that is attached to an output shaft of the servomotor 31 and a plurality of gears 31b that are disposed around the input gear 31a and that are meshed with the input gear 31a are arranged in the hollow hole 34. It is also possible to transmit a rotational force from the input gear 31a to each of the gears 31b via another gear.

The plurality of gears 31b are arranged around the center axis line CL at intervals, and the hollow hole 34 has a plurality of gear proximity portions 34a each of which has a shape formed along the outer circumferential surface of each of the gears 31b. For example, each of the gear proximity portions 34a has an arc shape formed along the outer circumference of each of the gears 31b. Furthermore, the hollow hole 34 has a plurality of small-diameter portions 34b that connect adjacent pairs of the gear proximity portions 34a. Because the gear proximity portions 34a are portions subjected to draught machining for accommodating the gears 31b in the hollow hole 34, the gear proximity portions 34a are located further away from the center axis line CL than the small-diameter portions 34b. Each of the small-diameter portions 34b typically has an arc shape centered on the center axis line CL. Thus, changing points at which the direction of extension of an inner circumferential surface of the hollow hole 34 changes are formed between the small-diameter portions 34b and the gear proximity portions 34a in the hollow hole 34.

As shown in FIGS. 3 and 4, a plurality of holes 36a are provided in a shaft end face 36 that is an end face of the shaft 33. Each of the holes 36a is a screw hole or a through-hole for bolt fastening.

Figure 5:
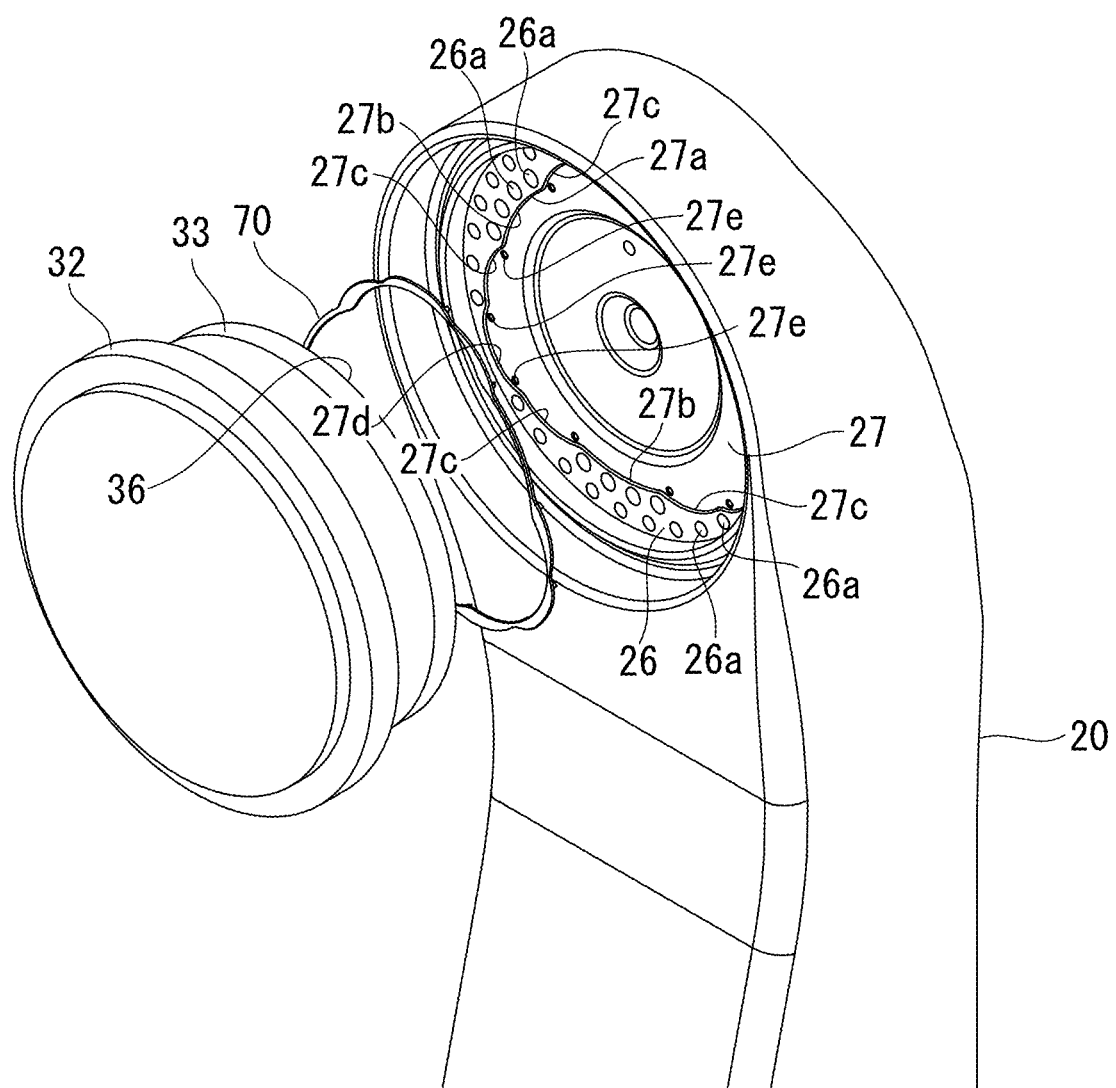
FIG. 5 is a perspective view of the second arm member and the reducer of the robot of this embodiment.

As shown in FIG. 5, an attachment surface 26 that is a substantially vertical surface with respect to the third axis line J3 and with which the shaft end face 36 is brought into surface contact is provided at the distal end of the second arm member 20. A plurality of holes 26a are provided in the attachment surface 26 and are respectively provided at positions corresponding to the holes 36a. The holes 26a are through-holes for fastening using the bolts B.

A recessed flat portion 27 is formed in the attachment surface 26. The recessed flat portion 27 is a portion recessed by 1 to several mm, for example, with respect to the attachment surface 26 in the direction along the center axis line CL. Furthermore, the recessed flat portion 27 continues over the entire circumference around the center axis line CL. The recessed flat portion 27 is, for example, a flat surface formed by performing milling or the like on the attachment surface 26. The space formed by the recessed flat portion 27 is not necessarily connected to the space formed by the hollow hole 34 and the second arm member 20.

When the shaft end face 36 is fastened onto the attachment surface 26 by using the plurality of bolts B, an outer periphery 27a of the recessed flat portion 27 is disposed at an outer side in the radial direction of the shaft 33, with respect to the edge of the hollow hole 34. The edge of the hollow hole 34 is formed in the shaft end face 36. Then, a partial area of the shaft end face 36 and at least a partial area of the recessed flat portion 27 are opposed to each other in the direction along the center axis line CL, and the opposing area continues over the entire circumference around the center axis line CL.

Figure 6:
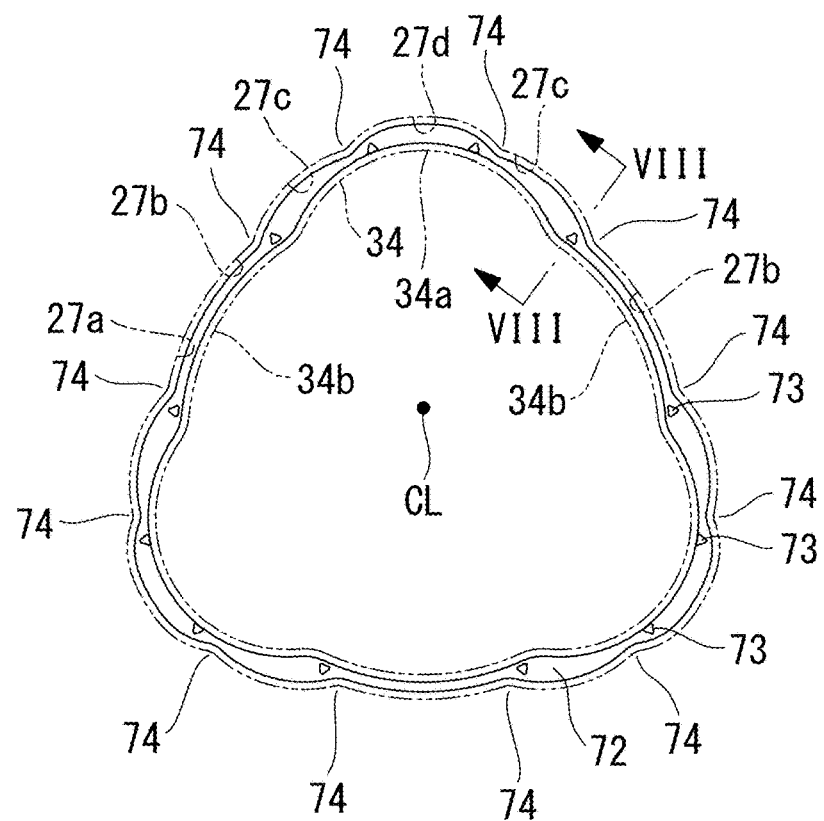
FIG. 6 is a plan view of a seal member of the robot of this embodiment.

FIG. 6 shows a relationship between the outer periphery 27a of the recessed flat portion 27 and the edge of the hollow hole 34, which is formed in the shaft end face 36. As shown in FIGS. 5 and 6, the outer periphery 27a has: arc-shaped first portions 27b that extend along the small-diameter portions 34b of the hollow hole 34; arc-shaped second portions 27c that bulge toward outer sides than the first portions 27b extending in their arc directions; and arc-shaped third portions 27d that bulge farther toward outer sides than the second portions 27c extending in their arc directions. Two of the second portions 27c and one of the third portions 27d correspond to each of the gear proximity portions 34a, and the third portion 27d is disposed between the two second portions 27c.

Thus, the outer periphery 27a of the recessed flat portion 27 has, between the first portions 27b and the second portions 27c, changing points at which the direction of extension of the inner circumferential surface of the outer periphery 27a changes, and also has similar changing points between the second portions 27c and the third portions 27d.

Figure 7:
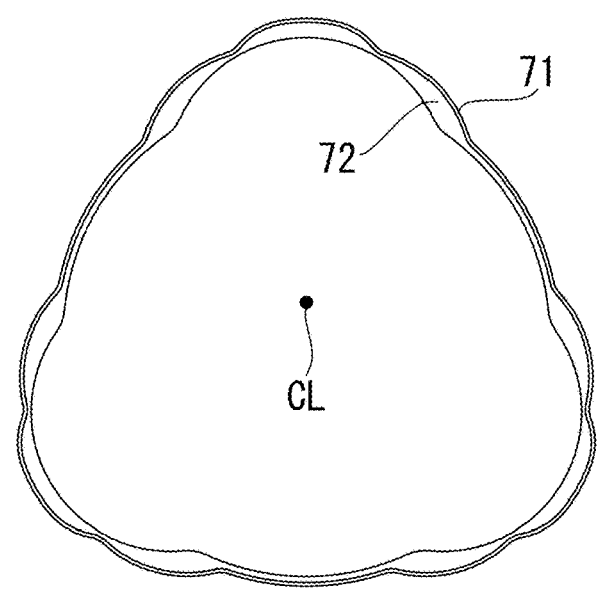
FIG. 7 is a bottom view of the seal member of the robot of this embodiment.
Figure 8:
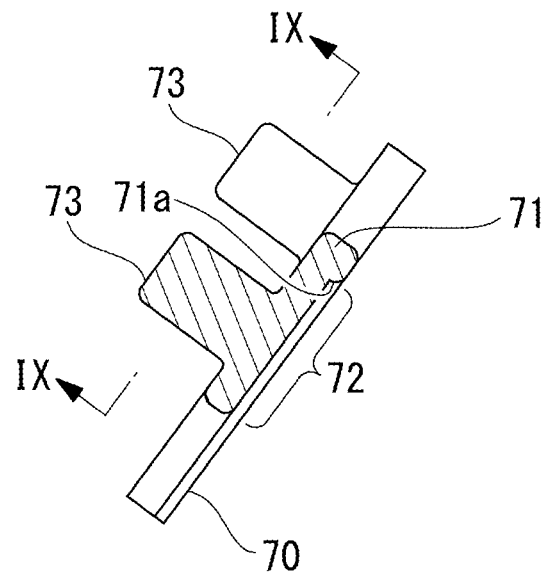
FIG. 8 is a sectional view cut along the line VIII-VIII in FIG. 6.

As shown in FIGS. 3 and 5, when the shaft end face 36 is fixed onto the attachment surface 26 by using the plurality of bolts B, a seal member 70 is disposed between the shaft end face 36 and the attachment surface 26. FIGS. 6 to 8 show the shape of the seal member 70. FIG. 6 is a view showing the seal member 70 viewed from the second arm member 20, FIG. 7 is a view showing the seal member 70 viewed from the reducer 32, and FIG. 8 is a sectional view cut along the line VIII-VIII in FIG. 6.

The seal member 70 is made of a material having oil resistance, for example, is made of a material having rubbery elasticity, such as nitrile butadiene rubber (NBR), acrylic rubber (ACM), fluoro-rubber, and silicone rubber. As shown in FIGS. 6 to 8, the seal member 70 has: a seal part body 71 that is continuous over the entire circumference around the center axis line CL; and a rib portion 72 that extends from the seal part body 71 in directions intersecting the center axis line CL, typically, in directions substantially perpendicular thereto. In this embodiment, although the rib portion 72 extends from the seal part body 71 in such directions as to approach the center axis line CL, the rib portion 72 may also extend from the seal part body 71 in such directions as to go away from the center axis line CL.

As shown in FIG. 8, the seal part body 71 has a seal portion 71a, which is typically called a bead portion, a lip portion, or the like. In this embodiment, the seal portion 71a is a protruding portion that protrudes in the direction along the center axis line CL. The seal portion 71a may be a portion that has a larger size than the other portion, in the direction along the center axis line CL. The seal portion 71a is formed over the entire circumference of the seal part body 71. The seal part body 71 has a function of forming a seal between the shaft end face 36 and the attachment surface 26.

The seal part body 71 is disposed on the above-mentioned opposing area, which is continuous over the entire circumference around the center axis line CL. Here, the hollow hole 34 has the plurality of small-diameter portions 34b and the plurality of gear proximity portions 34a, which are located further away from the center axis line CL than the small-diameter portions 34b. Furthermore, the changing points, at which the direction of extension of the inner circumferential surface of the hollow hole 34 changes, are formed between the small-diameter portions 34b and the gear proximity portions 34a in the hollow hole 34. Thus, the opposing area has a shape formed along the edge of the hollow hole 34. Specifically, the shape of the opposing area is not a simple shape, such as a round shape, an elliptical shape, or an oval shape, but have changing points corresponding to the above-described changing points.

In this embodiment, the seal part body 71 has a shape formed along the outer periphery 27a of the recessed flat portion 27. Thus, the shape of the seal part body 71 also has seal-shape changing points corresponding to part or all of the changing points on the outer periphery 27a.

A groove for accommodating the seal part body 71 or the seal portion 71a is not provided in the area of the recessed flat portion 27 and the area of the shaft end face 36, which correspond to the opposing area. As described above, the opposing area does not have a simple shape, and performing precise grooving on such an area, for sealing, incurs costs, which is not preferable. In this embodiment, a plurality of temporary-fixing holes 27e are provided in the recessed flat portion 27 and are arranged in the opposing area or in the vicinity thereof. Each of the temporary-fixing holes 27e is formed through drilling using a drill and has a round shape in cross section.

Figure 9:
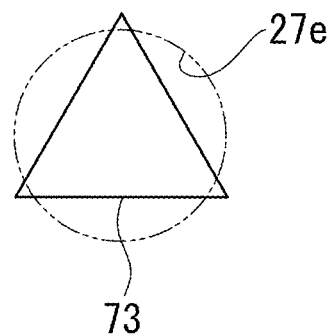
FIG. 9 is a sectional view cut along the line IX-IX in FIG. 8.

On the other hand, temporary-fixing members 73 are provided on the rib portion 72 of the seal member 70. The temporary-fixing members 73 have a column shape extending in the direction along the center axis line CL. In this embodiment, as shown in FIG. 9, each of the temporary-fixing members 73 has a polygonal shape in cross portion, in this embodiment, a triangle shape. Each of the temporary-fixing members 73 may have a polygonal shape, such as a star shape, in cross portion. In these cases, for example, as shown in FIG. 9, the external shape of each of the temporary-fixing members 73 is larger than the inner diameter of each of the temporary-fixing holes 27e. Furthermore, the cross-section area of the temporary-fixing member 73 is less than the cross-section area of the temporary-fixing hole 27e. Thus, it is easy to insert the temporary-fixing member 73 into the temporary-fixing hole 27e, and it is difficult for the temporary-fixing member 73 to fall out from the temporary-fixing hole 27e. Note that it is also possible to form each of the temporary-fixing members 73 into a round shape in cross section.

In this embodiment, in order to make it difficult to cause a situation in which the bead portion comes off inward from the edge of the shaft end face 36 due to an assembly error or a deformation of the seal member 70, the temporary-fixing members 73 and the temporary-fixing holes 27e are disposed in the vicinities of portions 74 of the seal member 70 that are relatively narrow in the width direction. Furthermore, the width dimension of the rib portion 72 of the seal member 70 is increased in regions corresponding to the gear proximity portions 34a of the hollow hole 34. This width dimension is the dimension in a radial direction of the shaft 33. Furthermore, the width dimension of the rib portion 72 is increased at an intermediate position between the adjacent temporary-fixing members 73 and gradually changes as the distance to each of the temporary-fixing members 73 is reduced.

When the respective temporary-fixing members 73 are inserted into the corresponding temporary-fixing holes 27e, the seal member 70 is temporarily fixed to the recessed flat portion 27, which is formed in the attachment surface 26. In this state, the shaft end face 36 is brought into surface contact with the attachment surface 26, and the shaft 33 is fixed to the distal end of the second arm member 20 by means of the plurality of bolts B. In this way, the sealing structure between the reducer 32 and the second arm member 20 is formed. Then, the seal part body 71 of the seal member 70 forms a seal, between the shaft end face 36 and the attachment surface 26, against lubricating oil etc. from the servomotor 31 and the reducer 32.

Figure 10:
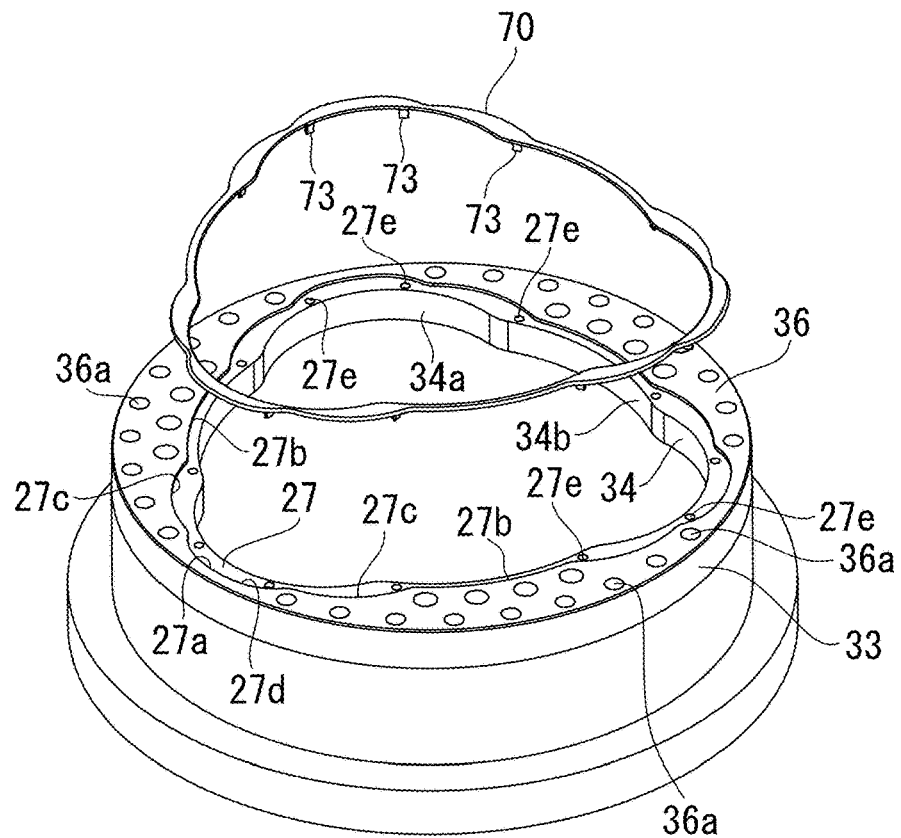
FIG. 10 is a perspective view of a reducer and a seal member according to a first modification of the sealing structure of this embodiment.

Note that, as shown in FIG. 10, the recessed flat portion 27 may also be formed in the shaft end face 36 of the shaft 33 of the reducer 32. In this case, the temporary-fixing holes 27e are formed in this recessed flat portion 27, and the recessed flat portion 27 need not be provided in the attachment surface 26 of the second arm member 20. With another variation in arrangement of the respective components, a similar sealing structure can also be formed.

Furthermore, it is also possible to provide the recessed flat portion 27 in the attachment surface 26 and to provide the temporary-fixing holes 27e in the shaft end face 36. The reverse arrangement is also possible. Also, in this case, in a state in which the seal member 70 is temporarily fixed by using the temporary-fixing holes 27e, the shaft 33 and the second arm member 20 are fastened to each other, and, thus, the seal member 70 forms a seal between the shaft end face 36 and the attachment surface 26.

Furthermore, a sealing structure between the proximal end of the second arm member 20 and the reducer 22 and a sealing structure between the first arm member 10 and the reducer 12 can also be formed in the same way as descried above. Furthermore, in a case in which a robot having the shafts of reducers attached to the other arm members 40 to 60 is formed, sealing structures between the arm members 40 to 60 and the reducers can be formed in the same way as described above.

In this embodiment, the sealing structure between the shaft 33 of the reducer 32 for driving the robot 1 and the arm member of the robot 1 is shown. This sealing structure includes: the shaft end face 36 of the reducer 32; and the attachment surface 26 of the arm member, which is to be in surface contact with the shaft end face 36. Furthermore, this sealing structure includes the plurality of bolts B, which fix the shaft 33 and the arm member to each other in a state in which the shaft end face 36 and the attachment surface 26 are in surface contact. Furthermore, this sealing structure includes: the recessed flat portion 27, which is provided in part of one of the shaft end face 36 and the attachment surface 26; and the seal member 70, which is disposed on the recessed flat portion 27.

Then, the recessed flat portion 27 is a portion recessed in the direction along the center axis line CL of the shaft 33 with respect to the shaft end face 36 or the attachment surface 26, and the recessed flat portion 27 is continuous over the entire circumference around the center axis line CL.

In this way, because the seal member 70 is provided on the recessed flat portion 27, a member that causes fastening looseness is not disposed between the shaft end face 36 and the attachment surface 26. This is advantageous in reliably fastening the reducer 32 and the arm member.

Furthermore, the seal member 70, which is disposed on the recessed flat portion 27, forms a seal between the shaft end face 36 and the attachment surface 26. Thus, even when a region to be sealed does not extend in a circular manner around the center axis line CL of the shaft 33, it is possible to easily and reliably form a seal surface with which the seal member 70 is in contact. With this configuration adopted, it is possible to inexpensively and reliably form the seal surface, compared with a case in which an O-ring groove that does not extend in a circular manner around the center axis line CL of the shaft 33 is formed.

Furthermore, the sealing structure of this embodiment further includes: the plurality of temporary-fixing holes 27e, which are provided in the shaft end face 36 or the attachment surface 26; and the plurality of temporary-fixing members 73, which are respectively inserted into the plurality of temporary-fixing holes 27e.

With this configuration, the seal member 70 is temporarily fixed to the recessed flat portion 27. This is advantageous in easily and reliably positioning the seal member 70 at a predetermined position of the recessed flat portion 27, which is not a groove.

Furthermore, the temporary-fixing members 73 in this embodiment are provided on the seal member 70 and have rubbery elasticity. In this way, because the temporary-fixing members 73 are provided on the seal member 70, it is easy to dispose the seal member 70 between the shaft end face 36 and the attachment surface 26.

Note that the temporary-fixing members 73 may also be bolts or pins that are separate from the seal member 70. When bolts are used, the bolts are fastened into the temporary-fixing holes 27e, which are female screw holes, and, when pins are used, the pins are fitted into the temporary-fixing holes 27e. Also, in this case, the seal member 70 can be easily and reliably temporarily fixed at the predetermined position of the recessed flat portion 27. Although the bolts or the pins remain in the sealing structure, there is no problem.

Furthermore, in this embodiment, the seal member 70 has: the seal part body 71, which is continuous over the entire circumference; and the rib portion 72, which extends from the seal part body 71 in directions intersecting the center axis line CL of the shaft 33. The seal part body 71 forms a seal between the shaft end face 36 and the attachment surface 26.

With this configuration, the rib portion 72 reinforces the seal part body 71 in the directions intersecting the center axis line CL of the shaft 33. This configuration is advantageous in easily and reliably disposing the seal part body 71, which is thin and long, at the predetermined position of the recessed flat portion 27.

Figure 11:
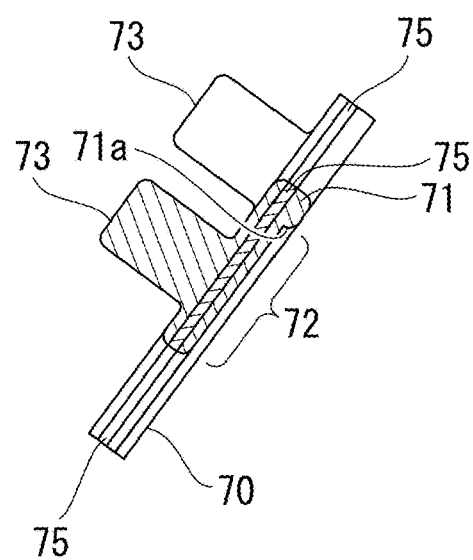
FIG. 11 is a sectional view of a seal member according to a second modification of the sealing structure of this embodiment.

Note that, as shown in FIG. 11, a plate-like reinforcing member 75 that extends in directions perpendicular to the center axis line CL of the shaft 33 may also be provided in the rib portion 72. In FIG. 11, although rubber is vulcanization-adhered to surfaces of the reinforcing member 75 on the both sides in the thickness direction, rubber may also be vulcanization-adhered to a surface of the reinforcing member 75 on one side in the thickness direction. In FIG. 11, although the reinforcing member 75 is disposed also in the seal part body 71, the reinforcing member 75 may also be disposed only in the rib portion 72.

Furthermore, the sealing structure of this embodiment further includes: the plurality of temporary-fixing holes 27e, which are provided in the shaft end face 36 or the attachment surface 26; and the plurality of temporary-fixing members 73, which are provided on the rib portion 72 of the seal member 70 and which are respectively inserted into the plurality of temporary-fixing holes 27e.

If the temporary-fixing members 73 are disposed at the positions corresponding to the seal part body 71, there is a high possibility that part of the seal part body 71 is disposed on the temporary-fixing holes 27e. In the above-described configuration, the temporary-fixing members 73 are not disposed at the positions corresponding to the seal part body 71. This is advantageous in improving the sealing performance and in improving the reliability.

Furthermore, in this embodiment, the hollow hole 34, which includes the center axis line CL of the shaft 33, is formed in the shaft end face 36, and each of the temporary-fixing members 73 has a triangle shape in cross portion. Furthermore, as shown in FIG. 6, a side of the triangle, the side being closest to the hollow hole 34, extends along the direction in which the edge of the hollow hole 34 extends.

Thus, the inner diameter of the seal member 70 can be increased as much as possible. From demands etc. for reducing the weight of the robot 1, the area of the shaft end face 36 tends to be reduced; thus, the area where the seal member 70 is disposed is also reduced. A reduction in the protrusion of the seal member 70 inward in the radial direction contributes a weight reduction of the robot 1.

Note that each of the temporary-fixing members 73 may be a rectangle in cross portion, and a side of the rectangle, the side being closest to the hollow hole 34, may extend along the direction in which the edge of the hollow hole 34 extends. This configuration affords the same advantageous effect as that obtained when a triangle is adopted.

Figure 12:
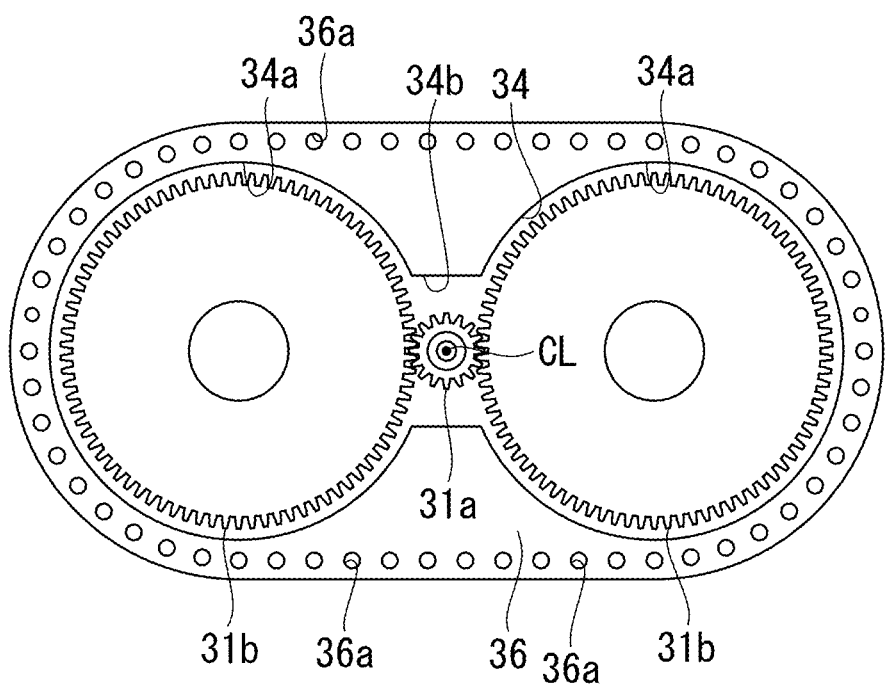
FIG. 12 shows a third modification of the sealing structure of this embodiment.

Note that, as shown in FIG. 12, in a case in which two gears 31b are disposed in the hollow hole 34, the recessed flat portion 27 is provided in the vicinity of the hollow hole 34, thereby making it possible to form the same sealing structure as that in the above-described embodiment.

With the above-described disclosure, it becomes possible to reliably fasten between the shaft of the reducer and the attachment surface of the arm member and to realize a highly reliable seal between the end face of the shaft and the attachment surface.

The invention claimed is:

1. A robot sealing structure that forms a seal between a shaft of a reducer for driving and an arm member, the robot sealing structure comprising:
   a shaft end face of the reducer;
   an attachment surface of the arm member, the attachment surface coming into surface contact with the shaft end face;
   a plurality of bolts that fix the shaft and the arm member to each other in a state in which the shaft end face and the attachment surface are in surface contact;
   a recessed flat portion that is provided in an interior part of one of the shaft end face and the attachment surface; and
   a seal member that is disposed on the recessed flat portion, wherein the recessed flat portion is a portion recessed in a direction along a center axis line of the shaft, with respect to the shaft end face or the attachment surface, and the recessed flat portion forms an outer periphery, wherein the outer periphery is formed in a non-circular shape, and wherein the recessed flat portion and outer periphery are continuous over an entire circumference around the center axis line.

2. The robot sealing structure according to claim 1, further comprising:
   a plurality of temporary-fixing holes that are provided in the shaft end face or the attachment surface; and
   a plurality of temporary-fixing members that are respectively inserted into the plurality of temporary-fixing holes.

3. The robot sealing structure according to claim 2, wherein the temporary-fixing members are provided on the seal member and have rubbery elasticity.

4. The robot sealing structure according to claim 2, wherein the temporary-fixing members are one of bolts to be fastened into the temporary-fixing holes or pins to be fitted into the temporary-fixing holes.

5. The robot sealing structure according to claim 1, wherein the seal member has a seal part body that is continuous over the entire circumference and a rib portion that extends from the seal part body in directions intersecting the center axis line; and the seal part body forms the seal between the shaft end face and the attachment surface.

6. The robot sealing structure according to claim 5, further comprising:
- a plurality of temporary-fixing holes that are provided in the shaft end face or the attachment surface; and
- a plurality of temporary-fixing members that are provided on the rib portion of the seal member and that are respectively inserted into the plurality of temporary-fixing holes.

7. The robot sealing structure according to claim 3, wherein each of the temporary-fixing members has a polygonal shape in its cross section.

8. The robot sealing structure according to claim 7,
- wherein a hollow hole that includes the center axis line is formed in the shaft end face;
- each of the temporary-fixing members has a triangle shape or a rectangle shape in cross section; and
- a side of the triangle shape or the rectangle shape, wherein the side is the closest to the hollow hole, extends along a direction in which an edge of the hollow hole extends.

9. A robot comprising a robot sealing structure according to claim 1.

\* \* \* \* \*